United States Patent
Soliman et al.

(10) Patent No.: US 11,318,849 B2
(45) Date of Patent: May 3, 2022

(54) BATTERY WITH EXTINGUISHING DEVICE, AND MOTOR VEHICLE

(71) Applicant: VOLKSWAGEN AKTIENGESELLSCHAFT, Wolfsburg (DE)

(72) Inventors: Ahmed Soliman, Isenbuettel (DE); Bastian Schaar, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 194 days.

(21) Appl. No.: 16/419,562

(22) Filed: May 22, 2019

(65) Prior Publication Data

US 2019/0359070 A1 Nov. 28, 2019

(30) Foreign Application Priority Data

May 23, 2018 (DE) ..................... 10 2018 112 284.5

(51) Int. Cl.
*B60L 50/64* (2019.01)
*A62C 3/07* (2006.01)
(Continued)

(52) U.S. Cl.
CPC ................ *B60L 50/64* (2019.02); *A62C 3/07* (2013.01); *B60L 3/0046* (2013.01);
(Continued)

(58) Field of Classification Search
CPC . A62C 3/00; A62C 3/07; B60L 3/0046; B60L 50/64; H01M 10/0525;
(Continued)

(56) References Cited

U.S. PATENT DOCUMENTS 9,490,507 B2  11/2016  Bandhauer et al.
9,704,384 B2   7/2017  Bandhauer et al.
(Continued)

FOREIGN PATENT DOCUMENTS

CN     101682186 A    3/2010
CN     103125039 A    5/2013
(Continued)

OTHER PUBLICATIONS

Search report for German Patent Application No. 10 2018 112 284.5, dated Jan. 25, 2019.
(Continued)

*Primary Examiner* — Basia A Ridley
*Assistant Examiner* — Heng M. Chan
(74) *Attorney, Agent, or Firm* — Pearl Cohen Zedek Latzer Baratz LLP

(57) ABSTRACT

A battery for a motor vehicle has a battery wall that encloses a battery interior, an extinguishing agent reservoir situated in the battery interior, in which an extinguishing agent is accommodated, and at least one battery cell that is situated in the battery interior separate from the extinguishing agent. The extinguishing agent reservoir has a reservoir wall for retaining the extinguishing agent, and the reservoir wall has a first wall temperature at a normal operating temperature of the battery cell and has a second wall temperature at a limiting operating temperature of the battery cell. The reservoir wall is designed to maintain sealtightness for retaining the extinguishing agent at the first wall temperature and to be destroyed by the heat at the second wall temperature. The second wall temperature is greater than the first wall temperature, and the reservoir wall may be brought to the second wall temperature by means of the battery cell of the battery. A motor vehicle has an electric motor and a battery according to the invention.

5 Claims, 3 Drawing Sheets

(51) Int. Cl.
*B60L 3/00* (2019.01)
*H01M 10/0525* (2010.01)
*H01M 10/42* (2006.01)
*H01M 50/20* (2021.01)

(52) U.S. Cl.
CPC ..... *H01M 10/0525* (2013.01); *H01M 10/425* (2013.01); *H01M 50/20* (2021.01); *H01M 2200/00* (2013.01); *H01M 2220/20* (2013.01)

(58) Field of Classification Search
CPC ........... H01M 10/4207; H01M 10/425; H01M 10/48; H01M 10/65; H01M 2200/00; H01M 2220/20; H01M 2/1077; H01M 50/20; Y02E 60/10; Y02T 10/70
See application file for complete search history.

(56) References Cited

U.S. PATENT DOCUMENTS

| | | |
|---|---|---|
| 2007/0164711 A1 | 7/2007 | Kim et al. |
| 2011/0005781 A1 | 1/2011 | Yasui et al. |
| 2014/0014376 A1* | 1/2014 | Schaefer ................ A62C 5/033 169/46 |
| 2016/0243385 A1 | 8/2016 | Rousseau et al. |
| 2017/0165513 A1* | 6/2017 | Li ......................... B60L 3/0046 |
| 2018/0248160 A1* | 8/2018 | Lee ....................... A62D 1/0014 |
| 2019/0359070 A1 | 11/2019 | Soliman et al. |

FOREIGN PATENT DOCUMENTS

| | | |
|---|---|---|
| CN | 103825059 A | 5/2014 |
| CN | 205759227 U | 12/2016 |
| DE | 10 2012 021 095 A1 | 5/2013 |
| DE | 10 2012 214 262 A1 | 2/2014 |
| DE | 10 2013 216 296 A1 | 2/2015 |
| JP | H09161754 A | 6/1997 |
| WO | WO-2017090866 A1 * | 6/2017 ............ H01M 50/20 |

OTHER PUBLICATIONS

Office Action for Chinese patent application CN 201910428109.8, dated Nov. 24, 2021.
Office Action for European patent application EP 19175630.3, dated Nov. 12, 2021.

* cited by examiner

BATTERY WITH EXTINGUISHING DEVICE, AND MOTOR VEHICLE

CROSS REFERENCE TO RELATED APPLICATIONS

This application claims priority from German Patent Application No. 10 2018 112 284.5, filed May 23, 2018, the entire contents of which is hereby incorporated by reference.

FIELD OF THE INVENTION

The present invention relates to a battery with an integrated extinguishing device for a motor vehicle, in particular an electric vehicle or hybrid vehicle. The invention further relates to a motor vehicle, in particular an electric vehicle or hybrid vehicle, having a generic battery.

BACKGROUND OF THE INVENTION

In particular full hybrid vehicles and electric vehicles are becoming increasingly important as an environmentally friendly and energy-saving alternative to conventional motor vehicles with an internal combustion engine. Full hybrid vehicles and electric vehicles have at least one electric motor that is designed for driving the motor vehicle; in addition to the electric motor, full hybrid vehicles have at least one internal combustion engine for driving the motor vehicle.

Full hybrid vehicles and electric vehicles have a rechargeable battery to provide electrical energy for operating the electric motor. A cruising range of full hybrid vehicles is at least partially dependent on the storage capacity of the battery. The cruising range of electric vehicles is proportional to the storage capacity of the battery. Since motor vehicles have only a limited installation space for batteries, it is possible to increase the capacity of the battery only by increasing the power density, i.e., the energy density of the battery.

Lithium-ion batteries, referred to below as Li-ion batteries, have a particularly high power density and a relatively large number of possible charge cycles and a particularly low capacity loss per charge cycle. For this reason, Li-ion batteries are now becoming widespread in automobile manufacturing, in particular for full hybrid vehicles and electric vehicles.

The advantage of high energy-density Li-ion batteries is at the same time a significant disadvantage of Li-ion batteries, since the high energy density is based essentially on the high reactivity of lithium. Due to the high reactivity of the lithium, Li-ion batteries represent a high risk to the environment, in particular in accident situations. In the event of plastic deformation of the Li-ion battery caused by an accident, for example lithium may leak from the Li-ion battery and react explosively with the surroundings, in particular water. In addition, such plastic deformation within the Li-ion battery may cause a short circuit, as the result of which the battery may overheat and ultimately burn or even explode.

To keep the risk of damage to an Li-ion battery in a motor vehicle as low as possible, these batteries are protected from external mechanical effects by means of a housing, a vehicle structure of the motor vehicle, and an underbody guard. The battery is preferably installed at a location in the motor vehicle at which the risk of damage to the battery is particularly low in the event of a collision.

However, even when the protective devices are taken into account to the greatest extent possible, a fire in the battery is never 100% preventable. For this reason, some motor vehicles with an Li-ion battery have an extinguishing device for controlling fires at the battery. U.S. Pat. No. 9,490,507 B2 describes a battery management system that is coupled to a fire extinguishing device. The individual battery cells of the battery are monitored by sensors. When local overheating of a battery cell is detected, a cooling medium is conducted to the battery cell in question through cooling channels that are integrated into the battery, as the result of which the battery cell may be cooled, and thermal runaway of the battery cell may be avoided or at least curtailed. U.S. Pat. No. 9,704,384 B2 relates to a refrigerant-conducting cooling system for a battery, having multiple cooling plates. In addition, the cooling system has injectors for targeted injection of the refrigerant into the battery in the event of damage to a cell. The resulting expansion of the pressurized refrigerant results in localized cooling and thus, quenching of the thermal runaway of the battery cells. DE 10 2012 021 095 A1 discloses a further extinguishing device for a battery. The extinguishing device has an external reservoir for accommodating the extinguishing agent, a sensor system for detecting cell damage, and a conduction system for conducting the extinguishing agent into the battery in response to the detection of a damaged battery cell by the sensor system.

DE 10 2012 214 262 A1 describes an extinguishing concept for high-voltage batteries in hybrid and electric vehicles. The extinguishing system has an extinguishing agent reservoir with a predetermined breaking point that is situated within a battery housing. In addition, the extinguishing system has a temperature sensor, a control device, and an actuator. When an exceedance of a limiting temperature is detected by the temperature sensor, the actuator is actuated by the control device in order to break open the extinguishing agent reservoir at the predetermined breaking point and thus release the extinguishing agent. DE 10 2013 216 296 A1 relates to a comparable battery in which a chemical sensor is used instead of a temperature sensor to detect damage to a battery cell.

Known batteries with extinguishing devices have the disadvantage that they have a very complex design, and require a complicated sensor system for detecting damage to battery cells, as well as an actuator for triggering the extinguishing operation. Accordingly, the manufacturing costs for known batteries having extinguishing devices are particularly high. In addition, in particular extinguishing devices having a complex design are very susceptible to disturbances, so that there is a relatively high residual risk that the extinguishing device is not triggered, or at the least is triggered late. The operating reliability of a motor vehicle is thus impaired. Moreover, predetermined breaking points have the disadvantage that they may accidentally fail, and may thus release extinguishing agent even though no cell damage is present. The service life of the battery may thus be adversely affected.

SUMMARY OF THE INVENTION

The object of the present invention, therefore, is to eliminate or at least partially eliminate the above-described disadvantages in a battery and in a motor vehicle with a battery. In particular, the object of the present invention is provide a battery, and a motor vehicle with a battery, that easily and cost-effectively ensure reliable extinguishing of the battery and thus avoid or at least reduce the risk of runaway of battery cells.

The above object is achieved by the patent claims. Accordingly, the object is achieved by a battery for a motor vehicle having the features of the claims, and by a motor vehicle with a generic battery having the features of the claims. Further features and details of the invention result from the subclaims, the description, and the drawings. Of course, features and details that are described in conjunction with the battery according to the invention also apply in conjunction with the motor vehicle according to the invention, and in each case vice versa, so that with regard to the disclosure, mutual reference is or may always be made to the individual aspects of the invention.

According to a first aspect of the invention, the object is achieved by a battery for a motor vehicle. The battery has a battery wall that encloses a battery interior, an extinguishing agent reservoir, situated in the battery interior, in which an extinguishing agent is accommodated, and at least one battery cell that is situated in the battery interior separate from the extinguishing agent. The extinguishing agent reservoir has a reservoir wall for retaining the extinguishing agent. The battery is designed in such a way that the reservoir wall has a first wall temperature at a normal operating temperature of the battery cell, and has a second wall temperature at a limiting operating temperature of the battery cell. According to the invention, the reservoir wall is designed to maintain sealtightness for retaining the extinguishing agent at the first wall temperature, and to be destroyed by heat at the second wall temperature. The second wall temperature is greater than the first wall temperature. The reservoir wall may be brought to the second wall temperature by means of a battery cell of the battery.

The battery wall is designed to protect the battery interior from external influences, in particular water, dirt, and mechanical stresses or the like. At least one battery cell, preferably multiple battery cells, is/are situated within the battery interior and preferably fixed in position relative to the battery housing.

The extinguishing agent reservoir is situated within the battery interior and sealed off in such a way that the extinguishing agent accommodated in the extinguishing agent reservoir remains therein during normal operation of the battery. In this way the battery cells of the battery are protected from the extinguishing agent. The extinguishing agent Novec 1230® from 3M is preferably used as extinguishing agent. One side of the extinguishing agent reservoir is situated facing at least one battery cell, for example adjacent, in particular directly adjacent, thereto. Heat emitted from the battery cell may thus be introduced into the reservoir wall. The reservoir wall is situated preferably close to the battery cell in order to improve the heat transfer. It may be provided according to the invention that the reservoir wall contacts the battery cell directly or via a thermally conductive intermediate material.

The normal operating temperature of the battery refers to a temperature range that the battery cell may have during operation, without damage to the battery. During operation of the battery, the first wall temperature of the reservoir wall will correspond, or at least essentially correspond, to the normal operating temperature. The reservoir wall is designed for maintaining a structure at the first wall temperature, and thus, ensuring that the extinguishing agent is securely retained.

The limiting operating temperature of the battery cell refers to a temperature at which operating reliability of the battery is no longer ensured. Above the limiting temperature, battery cells may experience runaway or explode, for example. The reservoir wall is designed to structurally fail when the second wall temperature is reached, in such a way that the sealtightness is no longer present and extinguishing agent may pass through the reservoir wall. This may take place, for example, by melting of the reservoir wall at the second wall temperature. The structural failure is preferably irreversible. The second wall temperature is preferably below 180° C., in particular between 120° C. and 160° C.

A battery according to the invention for a motor vehicle has the advantage over conventional batteries that runaway and explosion of battery cells is avoidable in a cost-effective manner, using simple means. Due to the composition of the reservoir wall, the reservoir wall is automatically destroyed when a battery cell of the battery reaches the limiting operating temperature, so that the overheated battery cell is quickly cooled or extinguished. An additional sensor system and actuator system are not necessary.

According to one preferred refinement of the invention, for a battery it may be provided that the reservoir wall contains an elastomer. The reservoir wall is preferably made, at least partially, of an elastomer. An elastomer has the advantage that the extinguishing agent reservoir is adaptable to free space within the battery interior. The volume of the extinguishing agent reservoir, and thus a quantity of extinguishing agent that can be accommodated therein, may be maximized in this way. Another advantage of an elastomer is that heat flow from the battery cell into the reservoir wall may be improved due to the flexibility of the reservoir wall.

It is preferred according to the invention that a portion of the reservoir wall is formed by the battery wall. This portion of the reservoir wall preferably has a different composition than a portion of the reservoir wall facing the battery cells. An extinguishing agent reservoir formed in this way has the advantage that it has a particularly space-saving design, and such a battery is manufacturable in a cost-effective manner, using simple means.

It is further preferred that a retaining device for keeping the extinguishing agent reservoir away from the battery cell is situated between the battery cell and the extinguishing agent reservoir. The retaining device preferably has higher rigidity than the reservoir wall, so that limited movement is provided for the extinguishing agent reservoir by means of the retaining device. For example, inadvertent contacting of the battery cell by the extinguishing agent reservoir may be avoided in this way. In addition, accidental damage to the extinguishing agent reservoir due to external vibrations may advantageously be avoided, using simple means.

In one particularly preferred embodiment of the invention, for a battery it may be provided that the retaining device is designed as a perforated plate or grid. Such a retaining device has the advantage that if the reservoir wall is damaged as the result of the second wall temperature, rapid, reliable flow of the extinguishing agent to the battery cell is ensured.

The retaining device is preferably coupled in a thermally conductive manner to the battery cell, in particular to a side of the battery cell facing away from the retaining device. For this purpose, the retaining device preferably contacts the reservoir wall and the battery cell. The retaining device is preferably coupled in a thermally conductive manner to multiple locations on the battery cell so that temperatures may be tapped at different locations on the battery cell. Thermal coupling has the advantage that release of the extinguishing agent upon reaching the limiting operating temperature of the battery is improved, and has a slight delay. In addition, by use of such a retaining device the heat generated by the battery cell may be led to the reservoir wall in a targeted manner, so that structural failure of predetermined areas of the reservoir wall may be brought about. Thermal coupling to the side of the battery cell facing away from the retaining device has the advantage that a delay in releasing the extinguishing agent may be further improved, in particular when the battery cell, at least temporarily, has different temperatures in different areas.

According to the invention, it is preferred that the retaining device is situated at a top side of the battery cell. The top side of the battery points upwardly in the installed state in a motor vehicle. This has the advantage that the extinguishing agent may be conducted to the battery cell by the force of gravity, so that improved extinguishing or cooling of the battery cell is ensured in a cost-effective manner, using simple means.

It is further preferred that the extinguishing agent reservoir is designed as a pressurized container. The extinguishing agent that is introduced into the extinguishing agent reservoir is preferably under positive pressure. This has the advantage that when the reservoir wall is destroyed, the extinguishing agent passes out of the extinguishing agent reservoir particularly quickly, and thus extinguishes or cools the battery cell in a particularly quick and effective manner.

It is preferred that the battery has a pressure sensor for monitoring an internal pressure in the extinguishing agent reservoir. It is further preferred that the internal pressure in the extinguishing agent reservoir is a function of the temperature of the extinguishing agent wall, so that the temperature of the extinguishing agent wall may be deduced from the detected pressure of the extinguishing agent. An imminent release as well as a completed release of the extinguishing agent may thus be identified, using simple means.

According to a second aspect of the invention, the object is achieved by a motor vehicle having an electric motor and a battery. According to the invention, the battery is designed as the battery according to the invention, according to the first aspect of the invention.

All previously described advantages concerning a battery for a motor vehicle according to the first aspect of the invention also result for the described motor vehicle. Accordingly, the motor vehicle according to the invention has the advantage over conventional motor vehicles that runaway and explosion of battery cells is avoidable in a cost-effective manner, using simple means. Due to the composition of the reservoir wall, the reservoir wall is automatically destroyed when a battery cell of the battery reaches the limiting operating temperature, so that the overheated battery cell is quickly cooled or extinguished. An additional sensor system and actuator system are not necessary. In particular in a collision situation, the motor vehicle according to the invention therefore has particularly high operating reliability.

BRIEF DESCRIPTION OF THE DRAWINGS

A battery according to the invention and a motor vehicle according to the invention are explained in greater detail below with reference to schematic drawings that show the following.

Elements having identical functions and operating principles are provided with the same reference numerals in each of FIGS. 1 through 3.

DETAILED DESCRIPTION OF THE INVENTION

Figure 1:
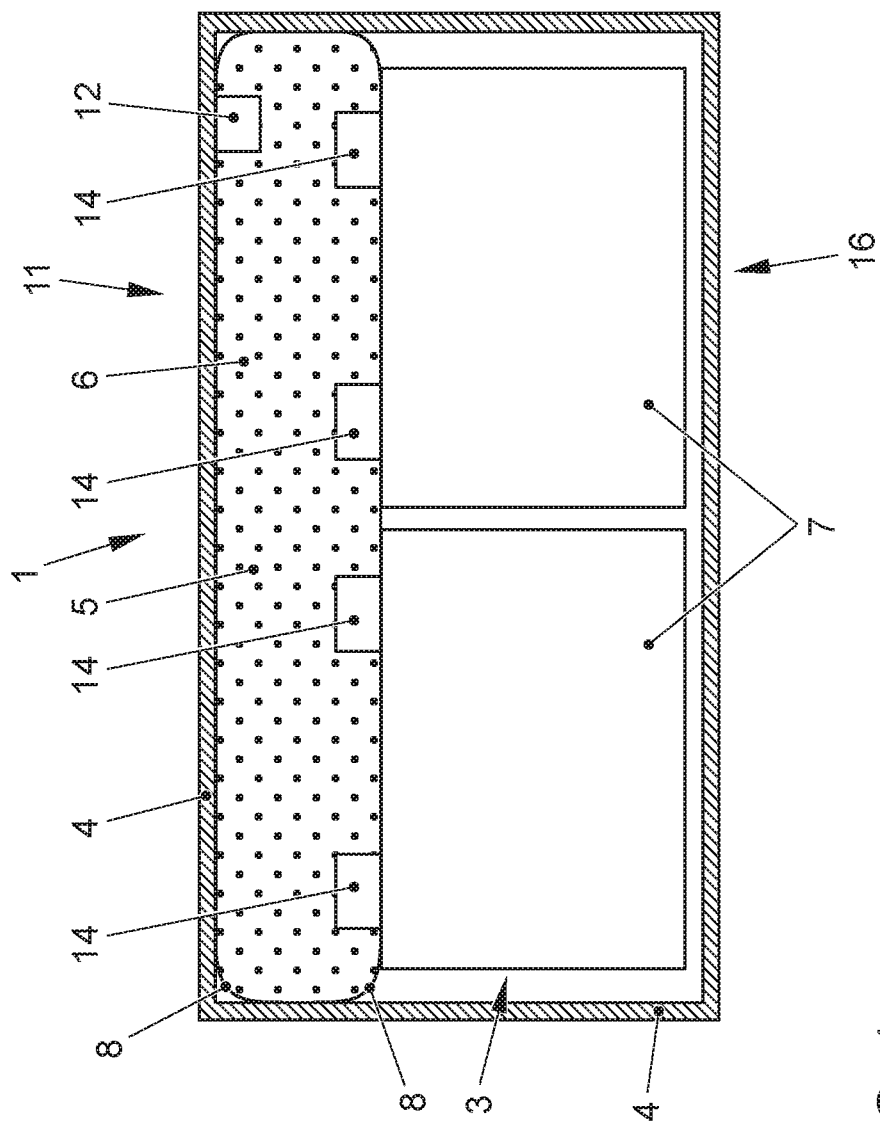
FIG. 1 shows a sectional illustration of a preferred first embodiment of a battery according to the invention.

FIG. 1 schematically depicts a preferred first embodiment of a battery 1 according to the invention in a sectional illustration. The battery 1 has a battery wall 4 that encloses a battery interior 3 and provides shielding from the outside. In the present example, two battery cells 7, in particular having an Li ion basis, are situated next to one another in the battery interior 3. The battery cells 7 each have two electrodes 14 that are oriented toward a top side 11 of the battery 1. An extinguishing agent reservoir 5 is situated within the battery interior 3 in the area of the top side 11 of the battery 1. A reservoir wall 8 of the extinguishing agent reservoir 5, which in particular contains an elastomer, contacts the battery wall 4 and the battery cells 7 as well as the electrodes 14. An extinguishing agent 6 that is preferably under positive pressure is situated within the extinguishing agent reservoir 5. The battery 1 has a pressure sensor 12, situated inside the extinguishing agent reservoir 5, for determining the pressure within the extinguishing agent reservoir 5. The reservoir wall 8 is designed to withstand a normal operating temperature of the battery cells 7, and when a limiting operating temperature is reached or exceeded, to yield to at least one battery cell 7 and release the extinguishing agent 6 for extinguishing or cooling the battery cell 7.

Figure 2:
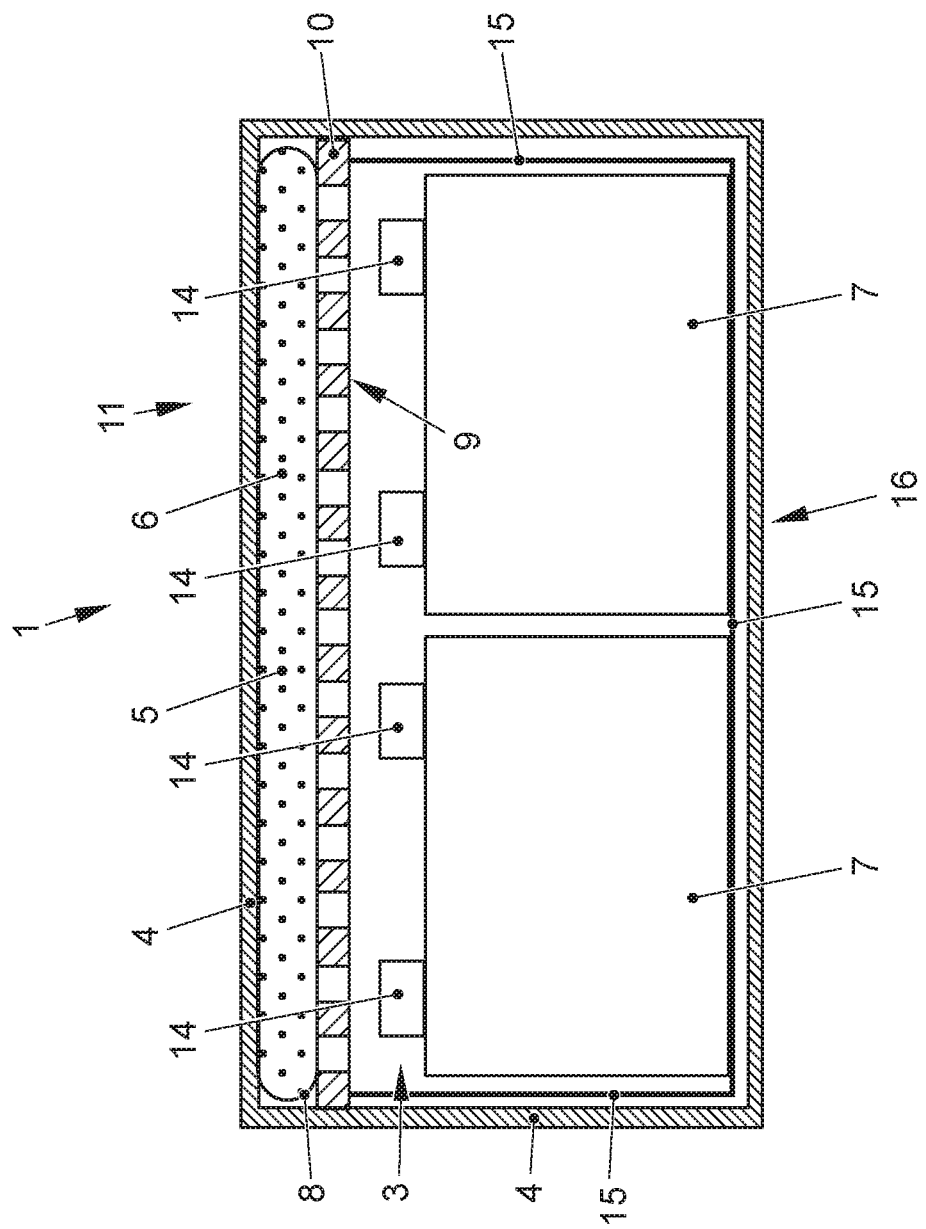
FIG. 2 shows a sectional illustration of a preferred second embodiment of a battery according to the invention.

FIG. 2 schematically shows a preferred second embodiment of a battery 1 according to the invention in a sectional illustration. The battery 1 has a battery wall 4 that encloses a battery interior 3 and provides shielding from the outside. In the present example, two battery cells 7, in particular having an Li ion basis, are situated next to one another in the battery interior 3. The battery cells 7 each have two electrodes 14 that are oriented toward a top side 11 of the battery 1. An extinguishing agent reservoir 5 is situated within the battery interior 3 in the area of the top side 11 of the battery 1. The battery 1 has a retaining device 9, designed as a perforated plate 10, for retaining the extinguishing agent reservoir 5. The retaining device 9 preferably has particularly good thermal conductivity, for example copper. In addition, the retaining device 9 is thermally coupled to a bottom side 16 of the battery cells 7 via optional thermal conductors 15. Heating of the retaining device 9 by the battery cells 7 may thus take place via the thermal conductors 15 and directly via thermal radiation. According to the invention, it may also be provided that the retaining device 9 contacts a top side 11 of the battery cell 7 directly or via a further thermal conductor 15, not illustrated. A reservoir wall 8 of the extinguishing agent reservoir 5, which in particular contains an elastomer, contacts the battery wall 4 and the retaining device 9. An extinguishing agent 6 that is preferably under positive pressure is situated within the extinguishing agent reservoir 5. The reservoir wall 8 is designed to withstand a normal operating temperature of the battery cells 7, and when a limiting operating temperature is reached or exceeded, to yield to at least one battery cell 7 and release the extinguishing agent 6 for extinguishing or cooling the battery cell 7. Conducting the extinguishing agent 6 from the extinguishing agent reservoir 5 to the battery cells 7 is facilitated by the holes provided in the perforated plate 10.

Figure 3:
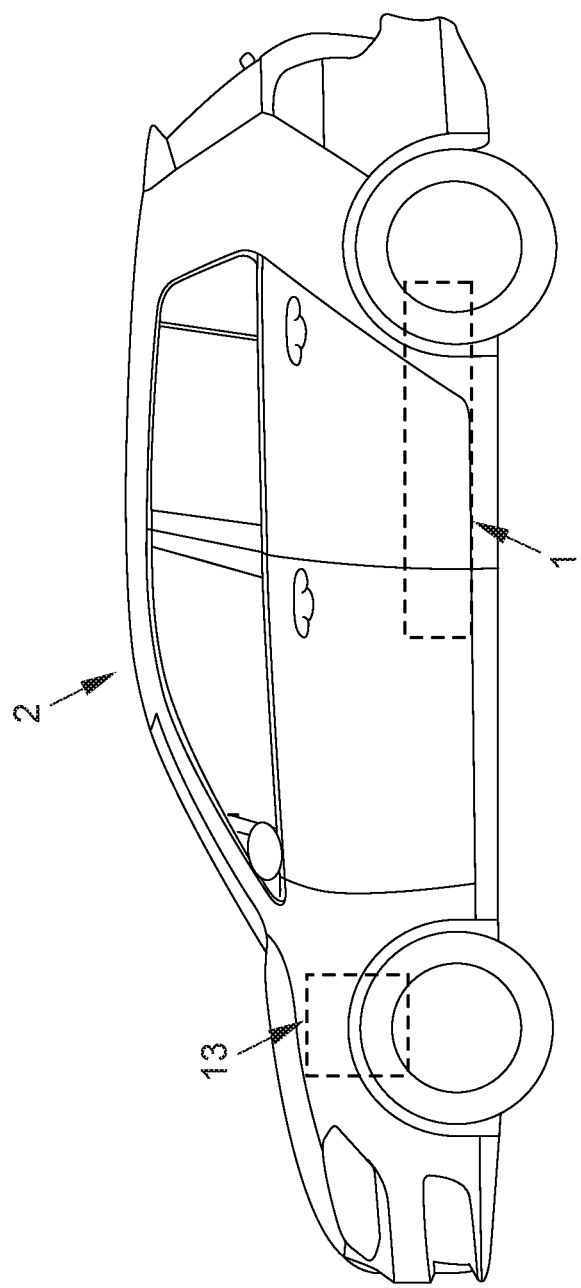
FIG. 3 shows a side view of a motor vehicle according to the invention.

FIG. 3 schematically illustrates a motor vehicle 2 according to the invention in a side view. The motor vehicle 2 has an electric motor 13 and a battery 1 according to the invention, which in this illustration are each indicated by dashed lines.

LIST OF REFERENCE NUMERALS 1 battery
2 motor vehicle
3 battery interior
4 battery wall
5 extinguishing agent reservoir
6 extinguishing agent
7 battery cell
8 reservoir wall
9 retaining device
10 perforated plate
11 top side
12 pressure sensor
13 electric motor
14 electrode
15 thermal conductor
16 bottom side

The invention claimed is:

1. A battery for a motor vehicle, having:
a battery wall that encloses a battery interior,
an extinguishing agent reservoir, situated in the battery interior, in which an extinguishing agent is accommodated, and
at least one battery cell that is situated in the battery interior separate from the extinguishing agent,
wherein the extinguishing agent reservoir has a reservoir wall for retaining the extinguishing agent, wherein the reservoir wall contacts the battery cell directly,
wherein the reservoir wall has a first wall temperature at a normal operating temperature of the battery cell, and has a second wall temperature at a limiting operating temperature of the battery cell,
wherein the reservoir wall contains an elastomer and is designed to maintain sealtightness for retaining the extinguishing agent at the first wall temperature, and to be destroyed by the heat at the second wall temperature, wherein the second wall temperature is greater than the first wall temperature,
wherein the reservoir wall may be brought to the second wall temperature by means of the battery cell of the battery, and
wherein the reservoir wall encompasses the contours of electrodes protruding from a top side of the battery cell.

2. The battery according to claim 1, wherein a portion of the reservoir wall is formed by the battery wall.

3. The battery according to claim 1, wherein the extinguishing agent reservoir is designed as a pressurized container.

4. The battery according to claim 1, further comprising a pressure sensor for monitoring an internal pressure in the extinguishing agent reservoir.

5. A motor vehicle having an electric motor and a battery, wherein the battery is designed as the battery according to claim 1.

* * * * *